(12) United States Patent
Gondre et al.

(10) Patent No.: US 12,188,361 B2
(45) Date of Patent: Jan. 7, 2025

(54) BLADE COMPRISING A SHIELD HAVING A DEFROSTING AIR PASSAGE DUCT

(71) Applicant: Safran Aircraft Engines, Paris (FR)

(72) Inventors: Guillaume Pascal Jean-Charles Gondre, Moissy-Cramayel (FR); Morgane Astrid Leger, Moissy-Cramayel (FR); Stéphane Roger Mahias, Moissy-Cramayel (FR); Romuald Bernard Mauvais, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/037,872

(22) PCT Filed: Nov. 10, 2021

(86) PCT No.: PCT/FR2021/051995
§ 371 (c)(1),
(2) Date: May 19, 2023

(87) PCT Pub. No.: WO2022/106772
PCT Pub. Date: May 27, 2022

(65) Prior Publication Data
US 2024/0003265 A1 Jan. 4, 2024

(30) Foreign Application Priority Data
Nov. 20, 2020 (FR) .................................. FR2011930

(51) Int. Cl.
*F01D 25/02* (2006.01)
*F01D 5/14* (2006.01)
(52) U.S. Cl.
CPC ............. *F01D 25/02* (2013.01); *F01D 5/147* (2013.01); *F05D 2220/36* (2013.01);
(Continued)

(58) Field of Classification Search
CPC .......... F01D 25/02; F01D 25/10; F01D 5/147; F01D 5/187; F01D 5/08; F01D 5/18;
(Continued)

(56) References Cited

U.S. PATENT DOCUMENTS 4,565,490 A * 1/1986 Rice ........................ F01D 9/065
415/114
8,282,342 B2 * 10/2012 Tonks ..................... F01D 5/187
416/95
(Continued)

FOREIGN PATENT DOCUMENTS

DE 38 15 906 A1 11/1989
FR 2 980 537 A1 3/2013
(Continued)

OTHER PUBLICATIONS

French Preliminary Search Report and Written Opinion for French Application No. 2011930, dated Jul. 15, 2021.
International Search Report and Written Opinion of the International Searching Authority for International Application No. PCT/FR2021/051995, dated Feb. 8, 2022.

*Primary Examiner* — Steven M Sutherland
(74) *Attorney, Agent, or Firm* — BIRCH, STEWART, KOLASCH & BIRCH, LLP

(57) ABSTRACT

The invention relates to a blade comprising a shield (14) attached to the upstream end of the body of the blade, the shield (14) comprising an upstream end forming a leading edge of the blade, the shield (14) further comprising a nose (141) upstream from which the leading edge is located, an pressure-face fin and an suction-face fin laterally attached on the blade, the fins extending from the nose, the blade comprising a defrosting air passage duct (15) arranged inside the nose and extending radially inside the nose, the duct (15) having an inner end (151) emerging opposite the
(Continued)

root (125) and a radially external end emerging from the nose between the leading edge and its junction at the pressure-face fin.

10 Claims, 6 Drawing Sheets

(52) U.S. Cl.
    CPC .. *F05D 2240/301* (2013.01); *F05D 2240/303* (2013.01); *F05D 2240/306* (2013.01)

(58) Field of Classification Search
    CPC ........... F05D 2220/36; F05D 2240/301; F05D 2240/303; F05D 2240/306; F05D 2260/20; F02C 7/047; F04D 29/584; F04D 29/5853
    See application file for complete search history.

(56) References Cited

U.S. PATENT DOCUMENTS

| | | | |
|---|---|---|---|
| 9,528,440 B2* | 12/2016 | Schott | F01D 25/30 |
| 2005/0109011 A1* | 5/2005 | Courtot | F01D 17/162 |
| | | | 60/39.093 |
| 2019/0024513 A1* | 1/2019 | Manning | F01D 5/284 |
| 2020/0332658 A1 | 10/2020 | Sidorovich Paradiso et al. | |

FOREIGN PATENT DOCUMENTS

| | | |
|---|---|---|
| WO | WO 2010/128240 A2 | 11/2010 |
| WO | WO 2012/066262 A2 | 5/2012 |
| WO | WO 2012/066262 A3 | 5/2012 |

\* cited by examiner

BLADE COMPRISING A SHIELD HAVING A DEFROSTING AIR PASSAGE DUCT

GENERAL TECHNICAL FIELD

The invention relates to a turbomachine blade having de-icing properties as well as a bladed wheel of a fan rotor including such a blade.

STATE OF THE ART

A turbomachine fan rotor generally includes a disk carrying on its external periphery blades whose roots are engaged in grooves of the external periphery of the disk.

The sizing of the blades must allow optimal aerodynamic performance while guaranteeing the mechanical strength of the blade and also limiting the acoustic signature of the blade. The improvement of the aerodynamic performance of the blades tends to an increase in the external diameter and therefore in the span of the blades, which tends to a decrease in the speed of rotation.

One problem is that by decreasing the speed of rotation, ice accretion can be generated on the blades, the higher speed allowing the separation of the ice from the blade.

Ice accretion damages the aerodynamic performance of the fan, which is prejudicial.

PRESENTATION OF THE INVENTION

The invention proposes to overcome at least one of these drawbacks.

To this end, the invention proposes according to a first aspect a blade including a body, the body including, in the direction of flow of an air stream, an upstream end and a downstream end, a radially outer tip, a radially internal root, the blade comprising between the tip and the root a vane intended to work aerodynamically in the air stream, a support connected to the root itself intended to be fixed in a cell of a rotor disk of a bladed wheel of a turbomachine fan, the blade further includes a shield attached to the upstream end of the body, the shield including an upstream end forming a leading edge of the blade, the shield further including a nose upstream of which the leading edge is located, a pressure-face fin and a suction-face fin laterally attached onto the vane, said fins extending from the nose, the blade comprising a de-icing air passage duct disposed inside the nose and extending radially inside the nose, said duct having an inner end opening out opposite the support and a radially outer end opening out from the nose between the leading edge and its junction with the pressure-face fin.

The invention, according to the first aspect, is advantageously completed by the following characteristics, taken alone or in any one of their technically possible combination:
- the radially outer end is configured so that the air circulating in the duct is discharged in the direction of flow of the air stream in the turbomachine fan;
- the air passage duct is disposed in the first half of the height of the vane taken between its tip and the root, preferably in the first half of the height taken between the support and the tip of the blade;
- the duct is cylindrical, straight or serpentine;
- the duct has been obtained by means of an additive manufacturing method.
- the duct has a width or an internal diameter less than or equal to 3 mm;
- the blade comprises means for conveying de-icing air intended to flow from a high-pressure compressor towards the inlet of the de-icing air passage duct;
- the means for conveying de-icing air consist of a duct formed in the support of the blade or consist of a duct extending at the level of the connecting disk of the blade, the conveying means further comprising a connector of the duct to the de-icing air passage duct.

According to a second aspect, the invention comprises a turbomachine fan bladed wheel, comprising at least one blade according to the first aspect of the invention.

According to a third aspect, the invention comprises a turbomachine fan bladed wheel, comprising at least a blade according to the first aspect of the invention and a disk into which the root of the blade is inserted, the disk comprising a rim, the wheel being such that the means for conveying de-icing air consist of a duct formed by machining of the rim of the disk.

According to a fourth aspect, the invention relates to a turbomachine comprising a bladed wheel according to the second aspect or according to the third aspect.

PRESENTATION OF THE FIGURES

Other characteristics, aims and advantages of the invention will emerge from the following description which is purely illustrative and not limiting and which should be read in relation the appended drawings in which.

Figure 4:
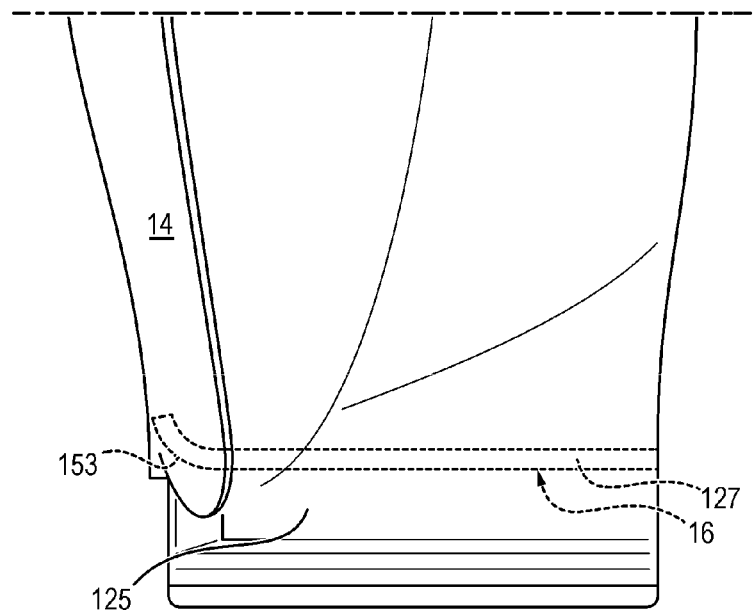
Figure 5:
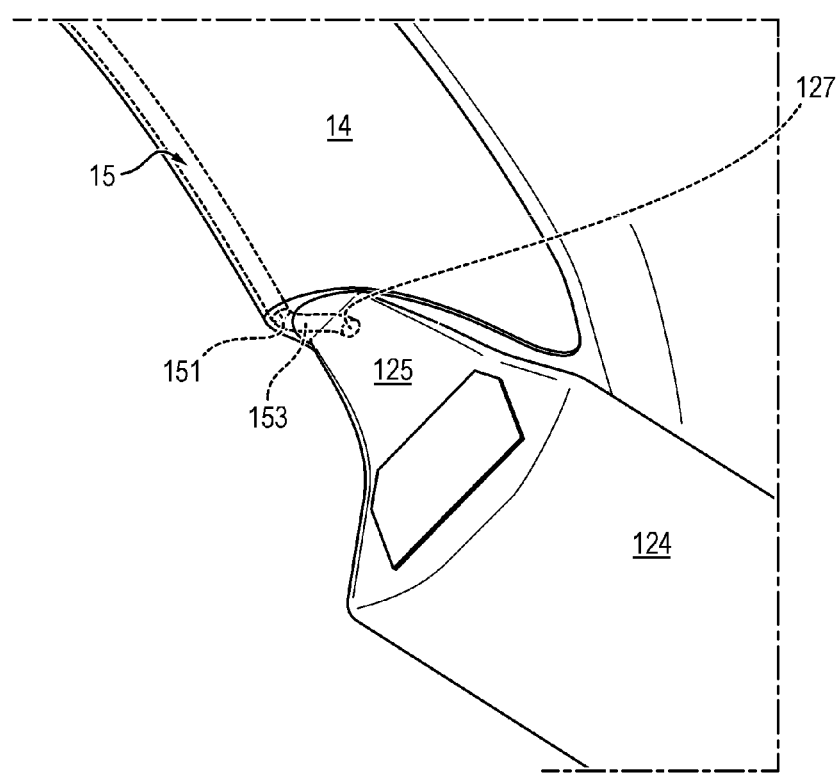
Figure 6:
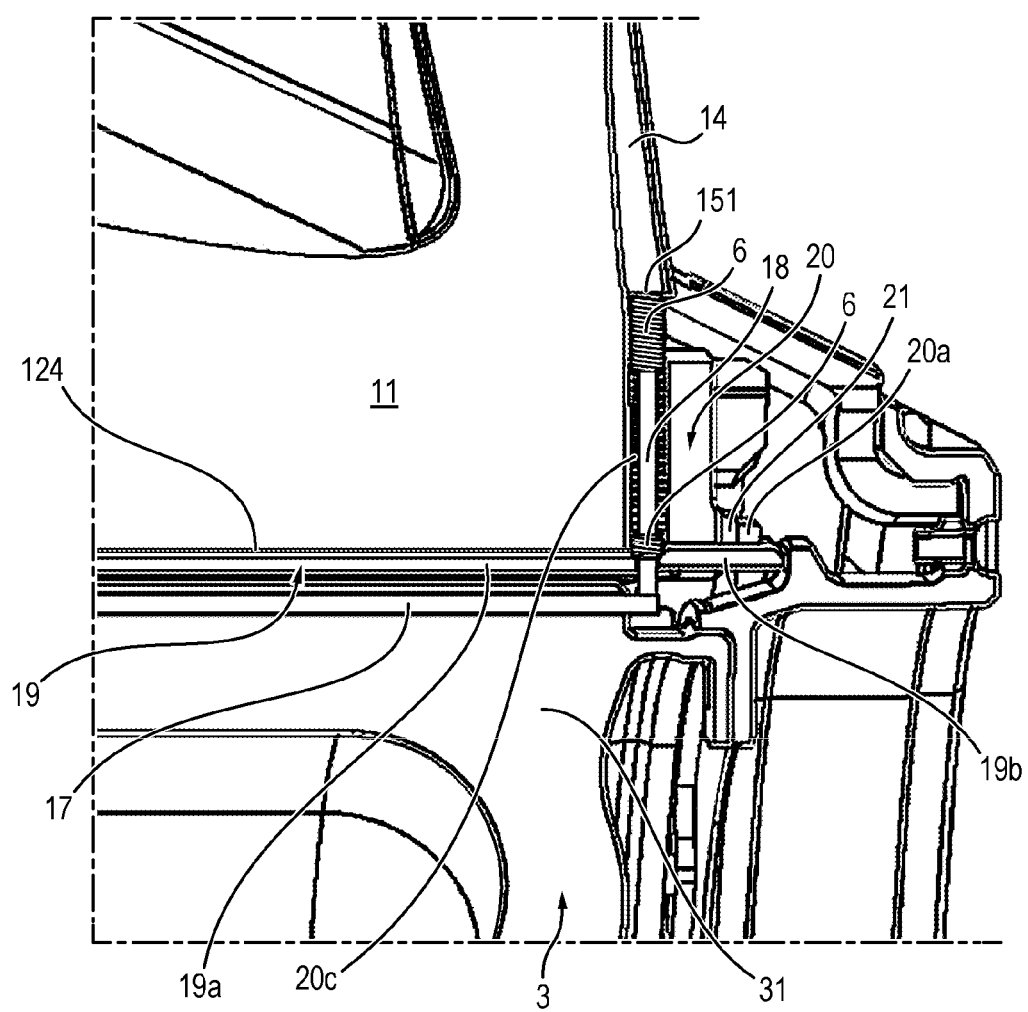
Figure 7:
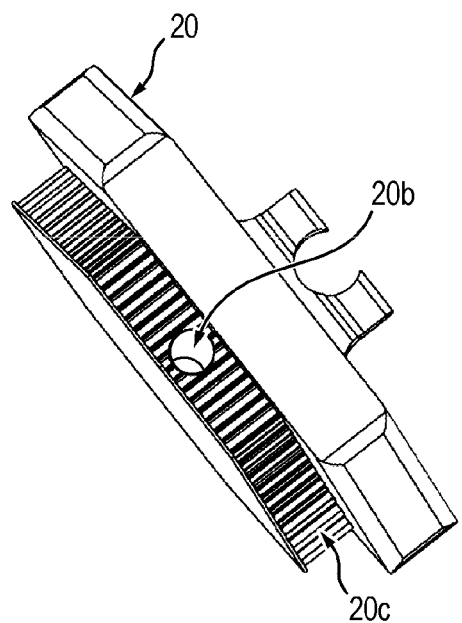
Figure 7:
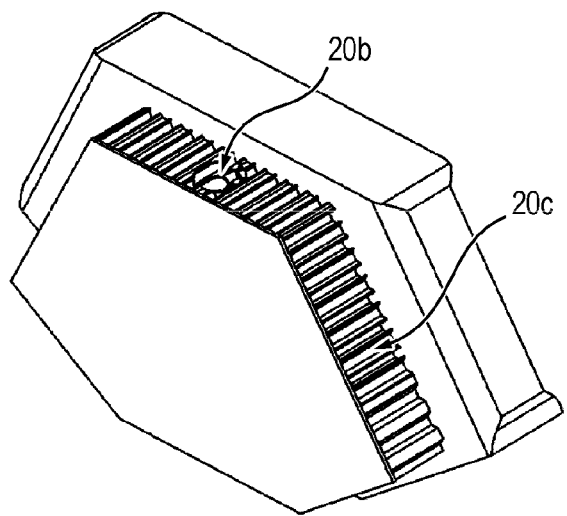

FIGS. 4 and 5 each illustrate a view of the blade with means for conveying de-icing air according to a first variant of embodiment;

FIG. 6 illustrates a view of the blade with means for conveying de-icing air according to a second variant of embodiment;

FIG. 7 illustrates a view of a lock used to fix the blade and involved in the second variant of embodiment.

In all the figures, similar elements bear identical references.

DETAILED DESCRIPTION

Figure 1:
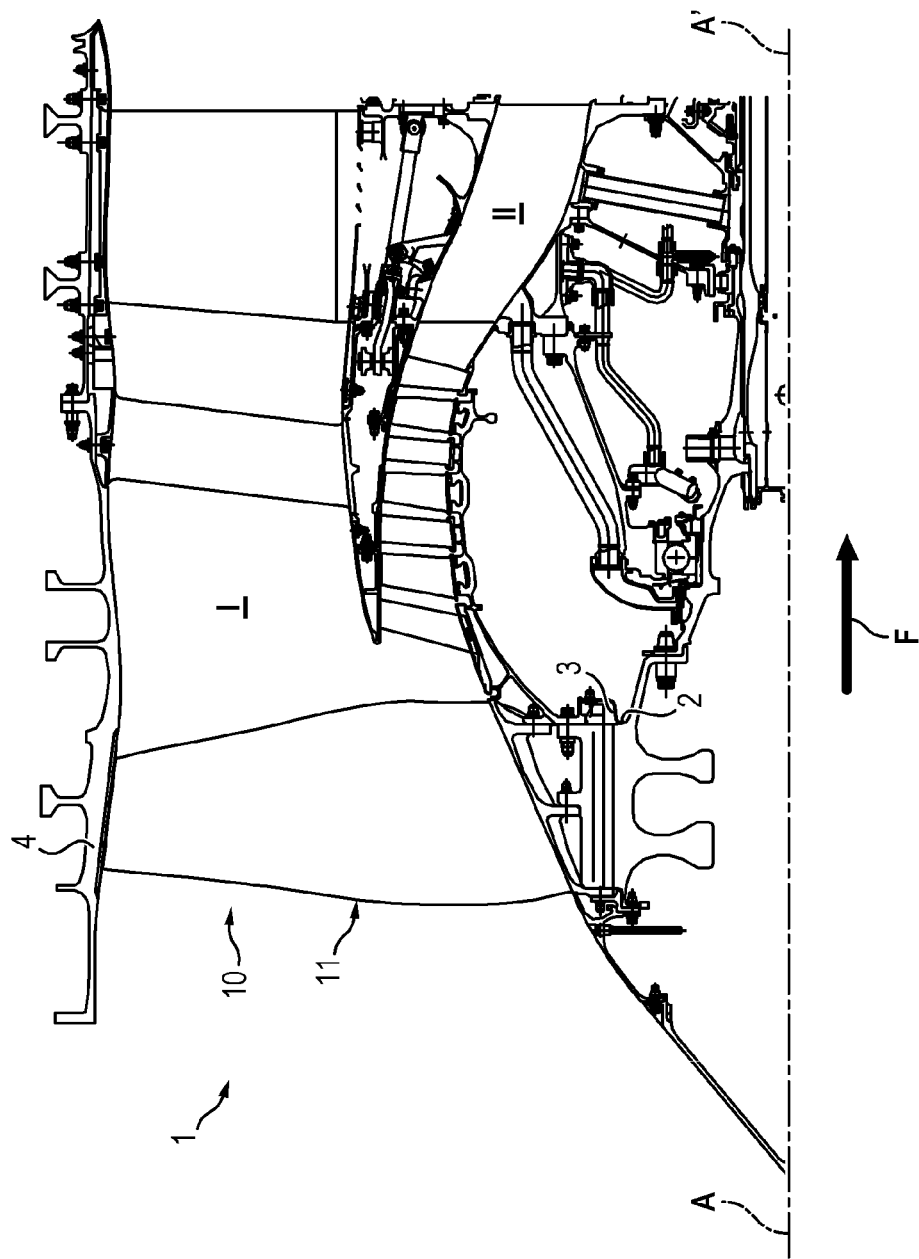
FIG. 1 illustrates a schematic sectional view of the upstream part of a turbomachine.

FIG. 1 illustrates a sectional view of the upstream part of a turbomachine. Particularly, a fan and the inlet of the primary I and secondary II flowpaths are visible.

The fan 1 comprises in particular a bladed wheel 10 comprising blades 11 each fixed to a cell 2 of a disk 3 of the rotor. The fan 1 here also comprises a casing 4 surrounding the bladed wheel but the blades which will be described can also belong to an unducted fan.

Figure 2:
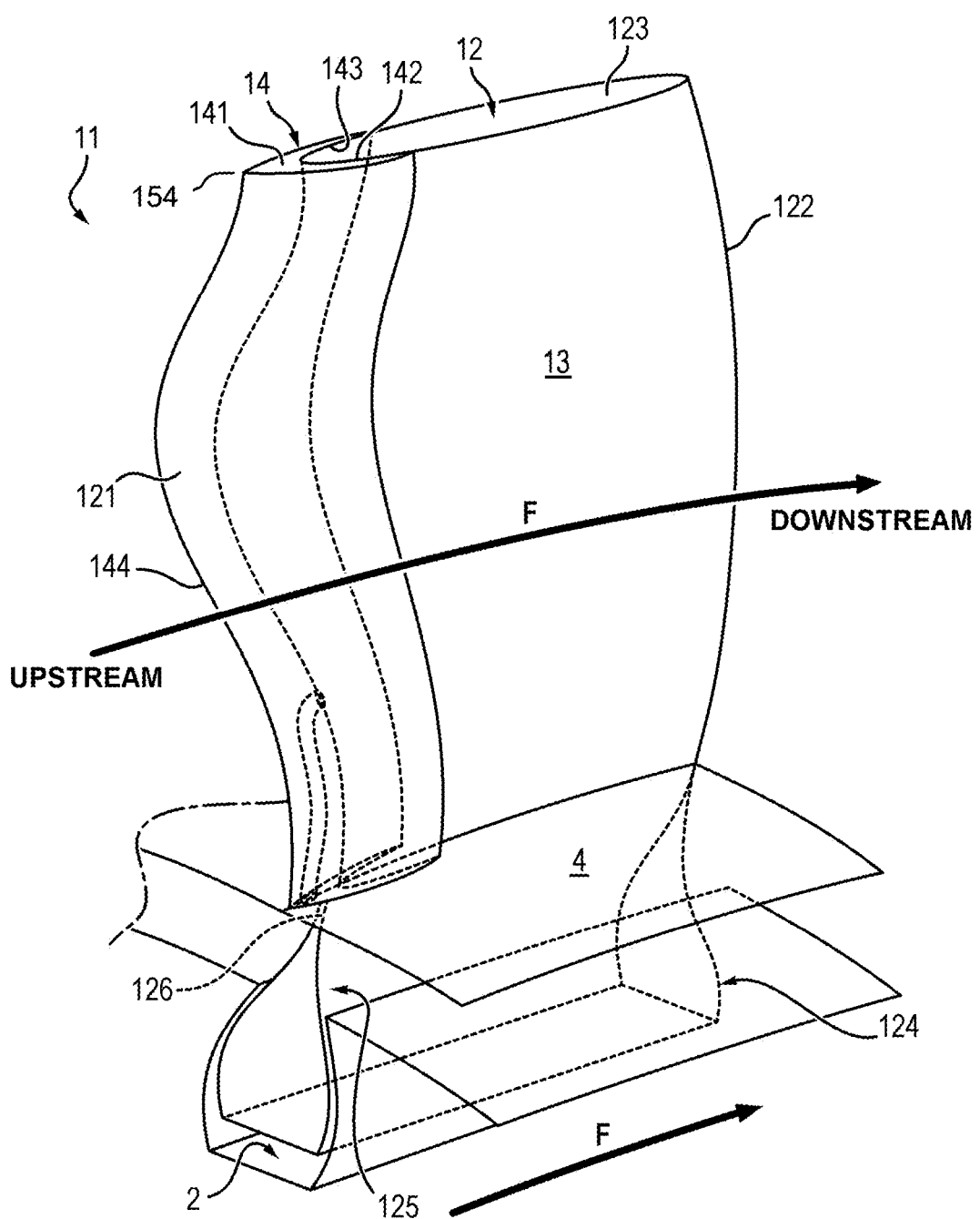
FIG. 2 illustrates a blade in accordance with the invention.

FIG. 2 illustrates a detailed view of a blade 11. Such a blade 11 comprises a body 12. The body is preferably made of composite having a 3D woven preform embedded in a resin.

The body 12 comprises, in the direction of flow F of an air stream, an upstream end 121 and a downstream end 122, a radially outer tip 123 and a radially inner root 124. It is also specified that in what follows, the upstream and the downstream are defined with respect to the direction of flow of the stream, the concept of radial direction is understood with respect to the axis of rotation of the turbomachine.

The blade comprises between the tip 123 and the root 124 a vane 13 intended to work aerodynamically in the air stream. The vane 13 constitutes the aerodynamic part of blade 11.

Furthermore, the blade 11 comprises a support 125 connected to the root 124 itself fixed in the cell 2 of the rotor disk 3. The support 125 is therefore the part between the root 124 of the blade 11 and an inter-blade platform 5. The root 124 for its part is the lower part of the blade inserted into the cell 2 of the disk. The vane 13 is therefore above the support 125 (along a direction taken between the root and the tip of the blade) and above the inter-blade platform 5.

In order to protect the blade 11, a shield 14 is attached to the upstream end of the body 12 of the blade 11. Particularly, the shield 14 is attached onto the vane 13 of the blade 11.

Such a shield 14 makes it possible to protect the blade against bird strikes and plays a role with respect to problems related to erosion. The shield 14 comprises an upstream end forming a leading edge 144 of the blade 11. In FIG. 2, the profile of the body of the blade 11 can be seen in dotted lines under the shield 14.

Advantageously, the shield 14 is metallic, preferably made of titanium. Other types of metals can be provided. It will be understood that the type of material chosen for the shield must satisfy mechanical and aerodynamic stresses.

The fixing of the shield 14 to the blade 11 is implemented by bonding or by soldering on the body 12 of the blade 11.

Complementarily, the shield 14 comprises a solid nose 141 and two fins 142, 143, a pressure-face fin 142 and a suction-face fin 143. The fins extend from the nose 141 and are also attached to the body of the blade 11 preferably by bonding. Furthermore, the fins 142, 143 have a thickness smaller than the thickness of the solid nose.

Figure 3:
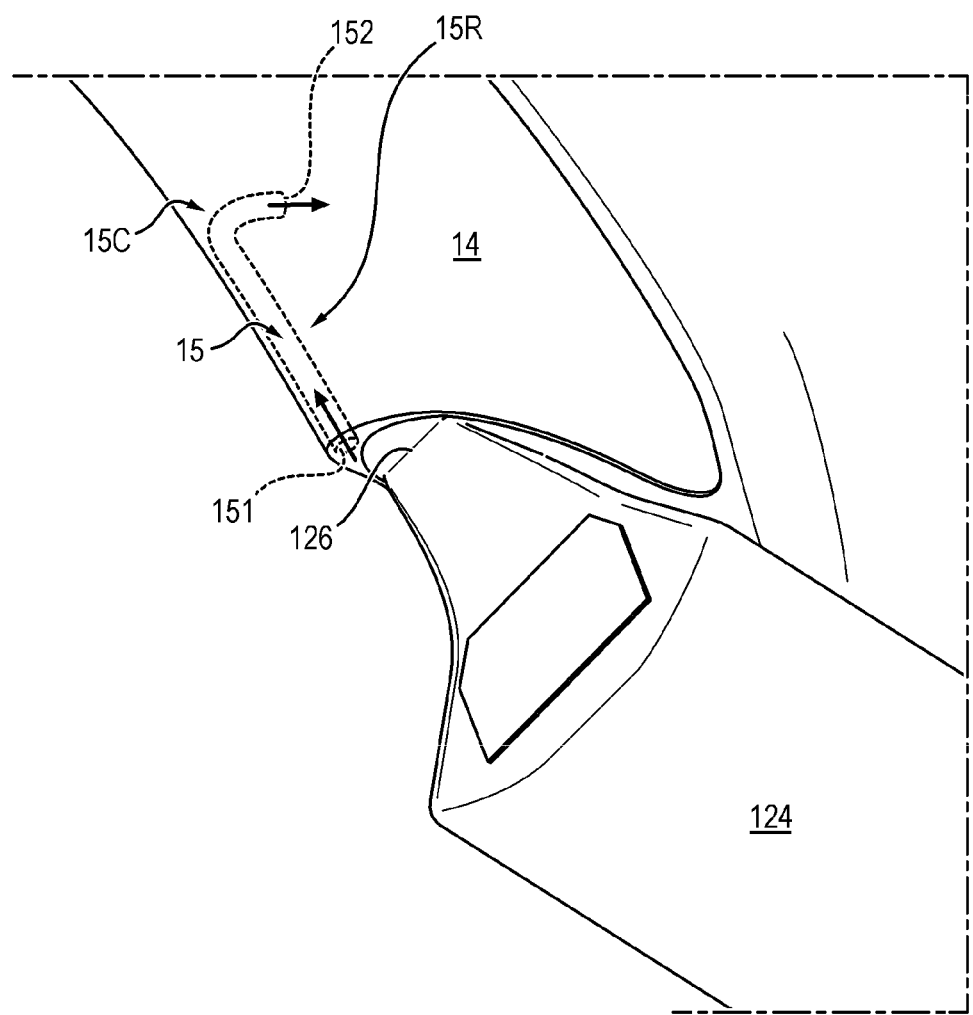
FIG. 3 illustrates a detail view of the blade of FIG. 2.

In order to avoid ice accretions at the level of the leading edge 144 and as can be seen in FIG. 3, a de-icing air passage duct 15 is provided inside the shield 14. The duct 15 is formed in the solid nose 141 of the shield 14. As this is the thickest part of the shield 14, it is at this location that the performance of the blade is damaged the least. Indeed, the fact of providing for a duct implies a structural modification of the shield 14 which is subjected to high mechanical stresses.

The duct 15 has an air inlet 151 and an air outlet 152. The duct extends radially along a radial direction taken between the root 125 and the tip 123 of the blade 11. The air inlet 151 is disposed opposite the support 125 at the level of its connection 126 to the vane 13 and the air outlet 152 opens out from the solid nose between the leading edge and the pressure-face fin. The duct is such that the air opens out downstream so as not to hinder the circulation of the air stream in the fan. The air outlet 152 is preferably located where the pressure is lowest in the fan.

For the outlet of the duct 15 to open out from the solid nose between the leading edge and the pressure-face fin, the latter has a first rectilinear portion 15R extending radially along a direction taken between the root 125 and the tip 123 of the blade 11 and a second bent portion 15C extending from the end of the first rectilinear portion 15R furthest from the root 124.

Preferably, the duct 15 is obtained by an additive manufacturing method and can take several shapes. In the figures, the duct 15 is bent and of cylindrical inner section but it can take other shapes. Particularly, it can be thin and straight or serpentine. The criterion adopted for the shape of the duct 15 is the mechanical strength of the shield 14. By the terminology "serpentine", it is possible to consider a substantially straight duct over most of its radial extent and bent at its radially outer end 154 opening out from the nose between the leading edge and its junction with the pressure-face fin as schematized in FIG. 2.

In order to modify the shield 15 as little as possible and not to modify its mechanical properties too much, the diameter or the width of the duct 15 inside the shield is less than or equal to 3 mm.

It is by circulating air in the duct 15 inside the shield 15 that ice accretions are avoided.

The duct 15 extends over a radial height of the vane 13. This radial height of the duct 15 is chosen according to the location where ice accretions are most often present and so as not to alter the aerodynamic and mechanical behavior of the blade. Indeed, an essential mechanical criterion is the control of the ingestion of foreign bodies. The ingestion of large-sized birds is critical at a height close to 50% of the blade height, and the ingestion of medium-sized birds is critical at a height close to 85% of the blade height. Thus, the bottom of the vane (below the 50% of the blade height) is less critical for the ingestion and a slight mechanical degradation at this location is acceptable. This is why the duct is in this part.

To avoid ice accretions, hot air preferably circulates in the duct 15, the hot air being able to be taken from different locations in the turbomachine.

The taken air preferably comes from a high-pressure compressor located downstream. It can be envisaged any other source for taking air in the stream, for example from a turbine, for example in the context of a fan of an open rotor.

The air can be conveyed from the high-pressure compressor in several ways.

As illustrated in FIGS. 4 and 5, according to a first way, a duct 16 which conveys the air taken from the high-pressure compressor to bring it to the inlet of the duct 15 is provided. Preferably, such a duct 16 is provided in the support 125. To do so, a cavity 127 is provided in the support 125 and the duct 16 is inserted into the cavity 127. Such a cavity 127 is obtained by weaving of a core debonding over the entire length of the blade chord. Then, a bent connector 153 constituting the second portion of the duct 16 makes it possible to connect the duct 16 to the de-icing air passage duct 15.

Alternatively, as illustrated in FIG. 6, according to a second variant, air comes from the disk 3 rather than from the support 125 of the blade. According to this alternative, it is not necessary to provide for a duct in the composite. Instead, a machining of a duct 17 in the rim 31 of the disk allows air to pass from downstream of the disk to the level of the shield 18. A channel 18 then vertically extends from the duct 17 to join the inlet 151 of the duct 15 in the leading edge 15. On its path, the duct 17 passes through a shim 19 and a lock 20 of the disk. Indeed, to mount the blade in the cell 2, an axial shim 19 is slid under the root 124 so as to ensure the radial holding of the blade in the cell 2. In addition, a lock 20 perpendicular to the shim 19 is positioned in notches arranged in the flanks of the cell 2 on the upstream side of the disk 3 (for additional details on the mounting with the lock 20, reference may be made to document WO 2012/150425).

As illustrated in this FIG. 6, the shim 19 comprises a part 19a which is housed in the cell 2 and an upstream end lug 19b which extends beyond the disk and serves as a connection with the lock 20. The connection is ensured by a screw 21 which passes both through the lug 19b and a lug 20a secured to the lock 20, the assembly immobilizing the blade in its cell.

Such a mounting is quite simple insofar as the shim 19 comprises numerous holes (not represented). On the other hand, to pass through the lock 20, the channel 18 (a flexible pipe for example) passes through a honeycomb structure 20c (called Nida) which is located just below the solid nose of the shield 15. FIG. 7 illustrates a perspective view of the lock 20 with the passage 20b for the channel 18 and the Nida 20c.

Finally, to ensure the sealing, two bellows-type seals 6 are provided at each interface: one between the duct 17 and the channel 18 and one between the inlet 151 of the duct 15 and the channel 18.

The invention claimed is:

1. A blade comprising a body, the body including, in a direction of flow of an air stream, an upstream end and a downstream end, a radially outer tip, a radially inner root, the blade comprising between the radially outer tip and the radially inner root a vane intended to work aerodynamically in the air stream, a support connected to the radially inner root, the radially inner root being intended to be fixed in a cell of a rotor disk of a bladed wheel of a turbomachine fan, the blade including a shield attached to the upstream end of the body, the shield including an upstream end forming a leading edge of the blade, the shield further including a nose upstream of which the leading edge is located, a pressure-face fin and a suction-face fin laterally attached onto the vane, the pressure-face fin and suction-face fin extending from the nose, the blade comprising a de-icing air passage duct disposed inside the nose and extending radially inside the nose, the de-icing air passage duct having an inner end forming an air inlet for the de-icing air passage duct, the air inlet opening out opposite the support and a radially outer end forming an air outlet, the air outlet opening out from the nose between the leading edge and a junction of the leading edge with the pressure-face fin, the de-icing air passage duct having a first rectilinear portion and a second bent portion extending from the end of the first rectilinear portion.

2. The blade according to claim 1, wherein the radially outer end is configured so that the air stream circulating in the de-icing air passage duct is discharged in the direction of flow of the air stream in the turbomachine fan.

3. The blade according to claim 1, wherein the de-icing air passage duct is disposed in a first half of the height of the vane taken between the radially outer tip and the radially inner root, preferably in the first half of the height taken between the support and the radially outer tip of the blade.

4. The blade according to claim 1, wherein the de-icing air passage duct has been fabricated by means of an additive manufacturing method.

5. The blade according to claim 1, wherein the de-icing air passage duct has a width or an internal diameter less than or equal to 3 mm.

6. The blade according to claim 1, comprising means for conveying de-icing air intended to flow from a high-pressure compressor towards the air inlet of the de-icing air passage duct.

7. The blade according to claim 6, wherein the means for conveying de-icing air comprises a duct formed in the support of the blade or consist of a duct extending at the level of a connecting disk of the blade, the means for conveying de-icing air comprising a connector of the duct to the de-icing air passage duct.

8. The turbomachine fan bladed wheel, comprising at least a blade according to claim 6 and a connecting disk into which the radially inner root of the blade is inserted, the disk comprising a rim, the turbomachine fan bladed wheel being such that the means for conveying de-icing air consist of a duct formed by machining of the rim of the disk.

9. A turbomachine comprising a bladed wheel according to claim 8.

10. A turbomachine fan bladed wheel, comprising at least one blade according to claim 1.

* * * * *